(No Model.)

V. M. BRAFFETT.
THILL COUPLING CLIP.

No. 282,951. Patented Aug. 14, 1883.

WITNESSES:
E. E. Sickler
H. P. Hood

INVENTOR:
Volney M. Braffett

UNITED STATES PATENT OFFICE.

VOLNEY M. BRAFFETT, OF INDIANAPOLIS, INDIANA.

THILL-COUPLING CLIP.

SPECIFICATION forming part of Letters Patent No. 282,951, dated August 14, 1883.

Application filed May 25, 1883. (No model.)

*To all whom it may concern:*

Be it known that I, VOLNEY M. BRAFFETT, a citizen of the United States, residing at Indianapolis, in the county of Marion and State of Indiana, have invented a new and useful Improvement in Securing Thill-Couplings to Axles, of which the following is a specification.

The object of my improvement is to prevent the clip, which is usually formed on thill-couplings for the purpose of securing them to an axle, from moving on and wearing the axle, and thereby becoming loose thereon. This object I attain by means of the device illustrated in the accompanying drawings.

Figure 2:
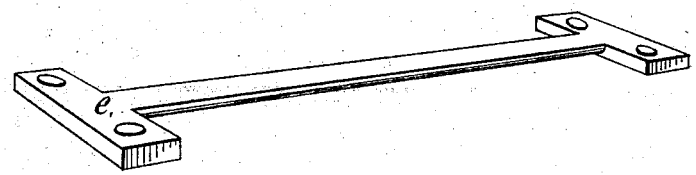
Figure 1:
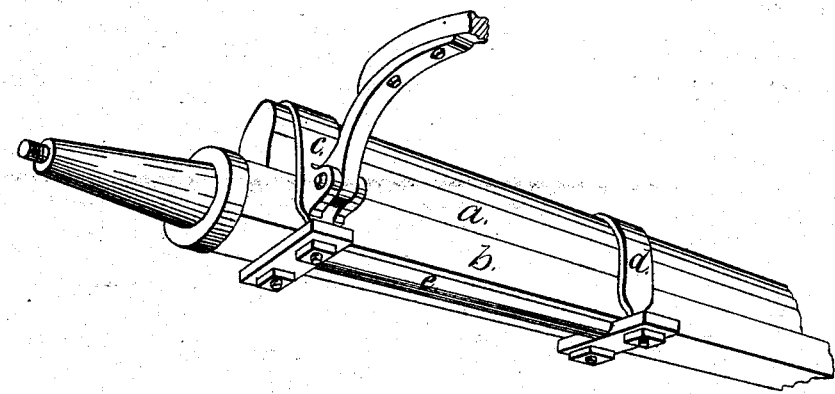

Figure 1 is a perspective view of a thill-coupling secured to an axle by my device. Fig. 2 is a perspective of my connecting-bar.

Thill-couplings are usually formed with a clip having two threaded shanks, and are adapted to embrace the wooden and iron portions of an ordinary carriage-axle, and are clamped to said axle by means of a short bar, through which said threaded shanks pass, and are secured by nuts screwed thereon. It has been found in practice that by reason of the short bearing thus formed on the axle that the frequent side strains to which the coupling is subjected cause the clip to twist slightly on the axle, thereby indenting the wood, and in a short time loosening the clip. I have discovered that by placing a second clip on the axle at a distance of about seven or eight inches from the thill-coupling, and connecting the two clips by means of a bar adapted to receive the threaded portions of both clips through it, and then screwing nuts on said threaded shanks, the thill-coupling is held firmly to its position, and does not twist on the axle and wear loose.

In the drawings, $a\ b$ is the axle; $c$, the thill-coupling clip; $d$, the second clip, and $e$ the bar connecting the two clips, which are clamped in place by the nuts $f\ f\ f\ f$.

I claim as my invention—

The combination, with an axle and a clip having a thill-coupling formed thereon and adapted to embrace said axle and to be clamped thereon, of a second clip also adapted to embrace and to be clamped upon said axle, and a bar, $e$, adapted to connect the two clips, substantially in the manner and for the purpose set forth.

VOLNEY M. BRAFFETT.

Witnesses:
E. E. SICKLER,
H. P. HOOD.